(12) United States Patent
Swain

(10) Patent No.: US 7,121,672 B1
(45) Date of Patent: Oct. 17, 2006

(54) ADJUSTABLE LIGHT ATTENUATOR OR BLOCKER FOR VEHICLE

(76) Inventor: Anthony T. Swain, 1637 Horace Barnes Rd., Calvert City, KY (US) 42029

( * ) Notice: Subject to any disclaimer, the term of this patent is extended or adjusted under 35 U.S.C. 154(b) by 0 days.

(21) Appl. No.: 11/387,325

(22) Filed: Mar. 23, 2006

(51) Int. Cl.
*G02B 27/00* (2006.01)

(52) U.S. Cl. .................. 359/601; 359/233; 359/900; 296/97.2; 296/97.3

(58) Field of Classification Search .............. 359/602; 296/97.2
See application file for complete search history.

(56) References Cited

U.S. PATENT DOCUMENTS

| | | | |
|---|---|---|---|
| 2,033,391 A | 3/1936 | Muench | |
| 2,163,495 A | 6/1939 | Levy | |
| 2,549,395 A * | 4/1951 | Short, Sr. | .................. 296/97.5 |
| 2,620,222 A | 12/1952 | Beauchamp | |
| 2,922,676 A | 1/1960 | Czajkowski | |
| 3,282,623 A | 11/1966 | Paro | |
| 3,940,180 A | 2/1976 | Altschul | |
| 4,172,613 A | 10/1979 | Furando | |
| 4,275,917 A | 6/1981 | Marcus | |
| 4,353,593 A | 10/1982 | Henson | |
| 4,763,947 A | 8/1988 | Gregg | |
| 4,958,879 A | 9/1990 | Gillum | |
| 4,989,910 A | 2/1991 | Mersman | |
| 5,005,895 A | 4/1991 | Muyres | |
| 5,033,786 A | 7/1991 | Bickford | |
| 5,042,550 A | 8/1991 | Yee | |
| 5,112,096 A | 5/1992 | Keenan | |
| 5,261,717 A | 11/1993 | Tsumura | |
| 5,267,599 A | 12/1993 | Kim | |
| 5,333,927 A | 8/1994 | PreJean | |
| 5,362,119 A | 11/1994 | Rosentratter | |
| 5,575,523 A * | 11/1996 | Keller | .................. 296/97.7 |
| 5,810,419 A | 9/1998 | Lam | |
| 5,873,621 A | 2/1999 | Kuighadush | |
| 5,979,967 A | 11/1999 | Poulson | |
| 6,131,987 A | 10/2000 | Rossiter | |
| 6,296,294 B1 | 10/2001 | Kohnle | |
| 6,513,855 B1 * | 2/2003 | Zenisek | .................. 296/97.9 |
| 6,682,122 B1 | 1/2004 | Prokhorov | |
| 6,981,733 B1 * | 1/2006 | Driscoll | .................. 296/97.6 |

* cited by examiner

Primary Examiner—Drew A. Dunn
Assistant Examiner—Derek S. Chapel
(74) Attorney, Agent, or Firm—King & Schickli, PLLC

(57) ABSTRACT

Attenuating or blocking light in a vehicle includes a rotatingly connected first and second sheet each with a plurality of holes and apertures, respectively. During use, a hole of the first sheet is registered with an aperture of the second sheet and both the hole and aperture are securely fitted about a support arm of a rear view mirror in the vehicle. Because the sheets are tinted or opaque, and fitted to eliminate space gaps, light incoming to the vehicle is attenuated or blocked. To adjust positioning, users realign a second hole of the first sheet with a second aperture of the second sheet and fit both about the support arm. Because of the arrangement of the sheets relative to one another, and their relative pivot point locations, the sheets hang in a different position on the support arm, after adjustment, higher or lower than before.

20 Claims, 8 Drawing Sheets

ADJUSTABLE LIGHT ATTENUATOR OR BLOCKER FOR VEHICLE

FIELD OF THE INVENTION

Generally, the present invention relates to blocking or attenuating light incoming to vehicles, such as automobiles. Particularly, it relates to a multi-use light attenuator or blocker having an adjustment feature for accommodating variously sized light openings in a variety of vehicles. More particularly, the invention contemplates attenuating sunlight or headlights of oncoming vehicles in a vehicle region near the windshield between the front seat sun visors. Alternatively, light is attenuated at vehicular side windows, such as on vehicle doors, or other windows. Various materials and arrangements therefor are contemplated.

BACKGROUND OF THE INVENTION

As is well known, drivers and passengers are often inconvenienced by sunlight or headlights entering their vehicle. Sometimes it is so severe that accidents or near-misses result. With reference to FIG. 1, an interior of an automobile is given generally as 10. While the visors 12 and 14 traditionally block sunlight and headlights from entering the windshield 16 and interfering with the vision of driver/passengers, a space or region 18 exists between the visors that has nothing blocking light. Sometimes, especially during dusk or dawn, light fills this space and causes visual inconvenience or impairment.

While many makeshift and specialized products have been developed over the years to attenuate or block light in this region, many do not appreciate the height H1, H2 and length L1 intricacies of various vehicles. Namely, heights H1 and H2 and length L1 are relatively large in the cab of a tractor trailer semi truck and relatively small in a compact passenger car. Thus, the various light attenuation devices over the years simply contemplating a single-sized attenuator is generally too small for semi trucks and too large, and perhaps too cramped, for compact cars. On the other hand, other attenuation devices have contemplated size adjustment, such as via the functionality of swing arms, splayed panels, flip panels or even motorized operation. However, these suffer from undo complexity and/or proneness to misalignment when the vehicle "bumps" upon encountering rough, rugged or potholed driving terrain.

Accordingly, there is a need in the art for a simple light attenuator or blocker for a vehicle contemplating both size adjustment for variously sized light openings in a variety of vehicles and reliable positioning methodology. Naturally, any improvements should further contemplate good engineering practices, such as relative inexpensiveness, ease of manufacturing, low complexity, etc.

SUMMARY OF THE INVENTION

The above-mentioned and other problems become solved by applying the principles and teachings associated with the hereinafter described methods and apparatus for adjustably attenuating or blocking light in vehicles. In one aspect, this contemplates height adjustment and in another contemplates adjusting a light attenuating or blocking boundary either smaller or larger. In either, two sheets rotatably connect to one another. Each has various holes, apertures, slots or cuts that align and register with one another to stably and securely accommodate a support arm of rear view mirror in the vehicle and block or attenuate light in the vicinity of the mirror.

In a representative embodiment, the first sheet includes a plurality of holes aligned substantially along the length of a slot. A second sheet includes a plurality of apertures, each with an attendant cut. During use, a first hole of the first sheet is registered with a first aperture of the second sheet and both the hole and the aperture are securely fitted about the support arm of the rear view mirror in the vehicle. Because the sheets are tinted or opaque, light incoming to the vehicle in the vicinity of the rear view mirror is attenuated or blocked. To adjust positioning, users realign a second hole of the first sheet with a second aperture of the second sheet and fit both the second hole and the second aperture about the support arm. Because of the arrangement of the sheets relative to one another and their free articulation about a pivot point, the sheets hang in a different position on the support arm higher or lower than before. The sheets may also create a larger or smaller area or boundary for blocking or attenuating light in the new position because of various sheet shapes, sizes and pivot points.

In other embodiments, degrees of sheet opacity, color adding/subtracting, ultraviolet blocking, color selection, composition selection, including size, shape and weight selection, counterweights, handles, and chamfers, to name a few, are contemplated.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENTS

In the following detailed description of the preferred embodiments, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized and that process, mechanical and/or other changes may be made without departing from the scope of the present invention. In accordance with the present invention, methods and apparatus for adjustably attenuating or blocking light in a vehicle are hereinafter described.

Figure 1:
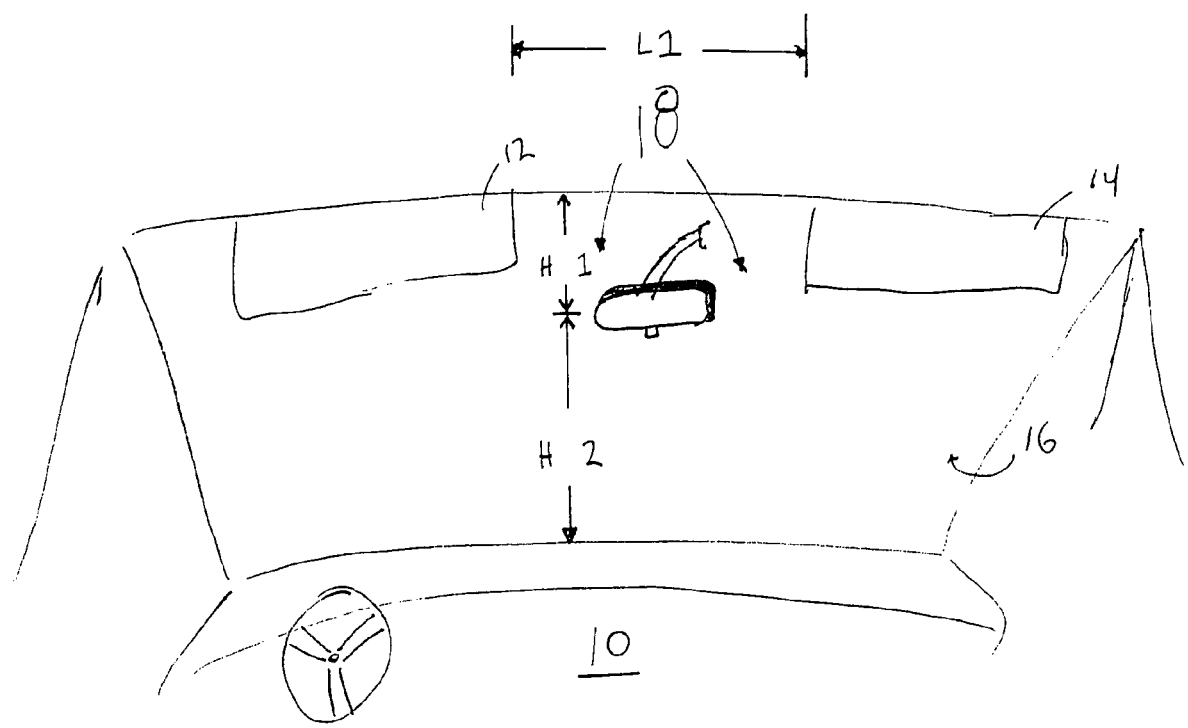
FIG. 1 is a diagrammatic view in accordance with the prior art of a vehicle interior having light openings.
Figure 2:
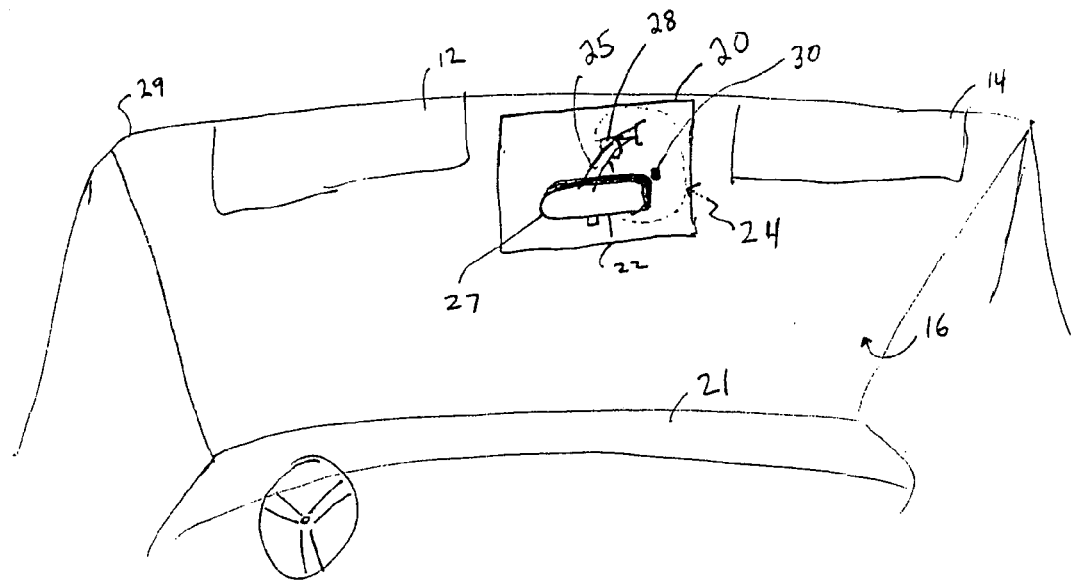
FIG. 2 is a diagrammatic view in accordance with the present invention of a light attenuator or blocker having features for adjustment.
Figure 3:
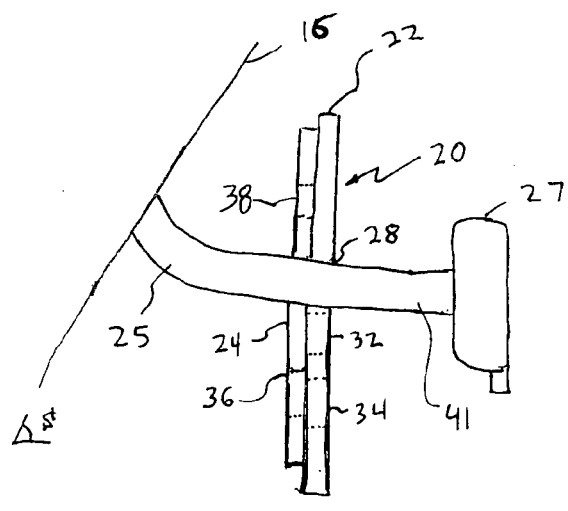
FIG. 3 is a diagrammatic side view in accordance with the present invention of the light attenuator or blocker of FIG. 2.
Figure 3:
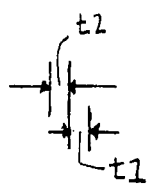
Figure 4A:
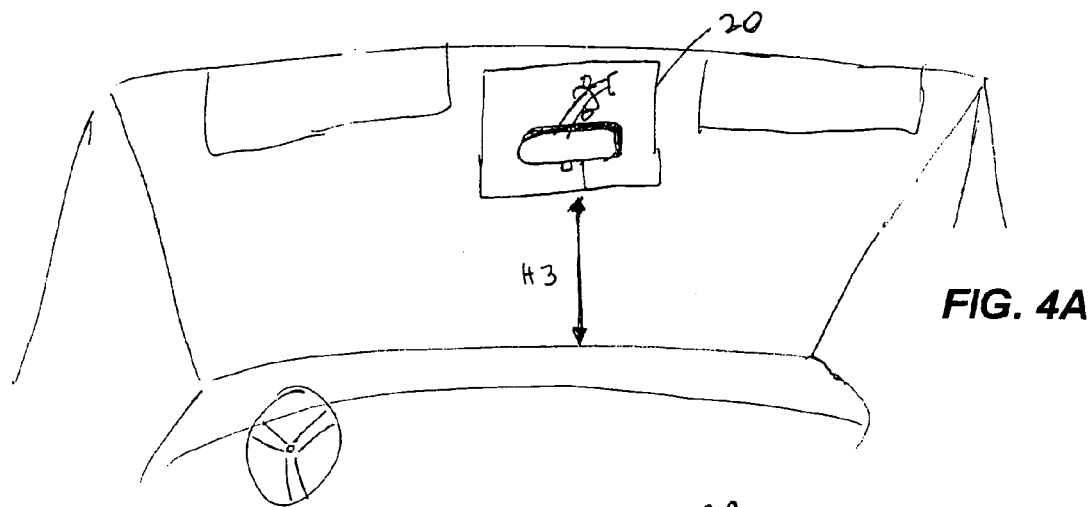
FIGS. 4A–4C are diagrammatic views in accordance with the present invention of the light attenuator or blocker of FIGS. 2 and 3 in various operational positions.
Figure 4B:
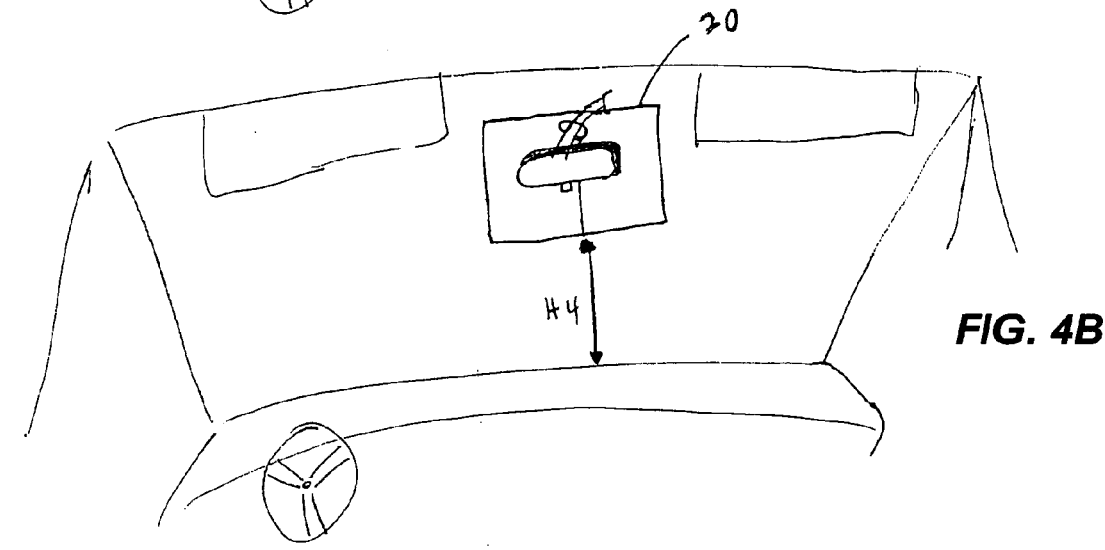
Figure 4C:
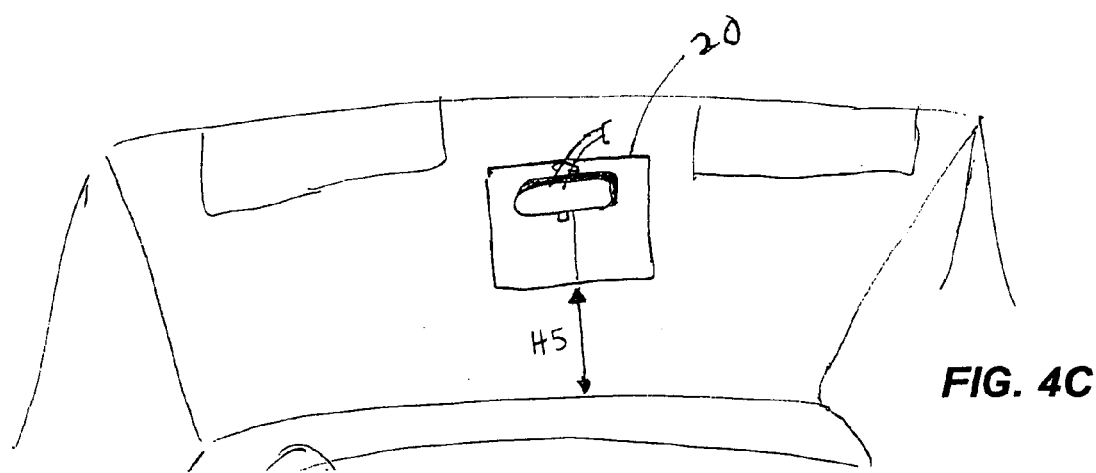

With reference to FIGS. 2 and 3, an attenuator or blocker of the invention is given generally as 20. It hangs, in practice, from a support arm 25 of a rear view mirror 27 of a vehicle 29. It blocks or attenuates light incoming to a windshield 16 in the vicinity of the rear view mirror, especially between the visors 12 and 14. It also includes a first and second sheet 22, 24 articulated or connected to one another at a pivot point 30. During use, the sheets are manipulated to align and register a hole of the first sheet with an aperture of the second sheet so that both 28 can accommodate the support arm 25 of the mirror. Because the sheets are tinted or opaque, light incoming to the vehicle nearby the mirror is attenuated or blocked from the vision of drivers and passengers. When not in use, the two sheets freely circulate relative to one another about the pivot point and this enables users to adjust the positioning of the attenuator or blocker in the vehicle. Specifically, users realign a second 32 or third hole 34 of the first sheet with a second 36 or third aperture 38 of the second sheet, respectively, and fit both the second hole and the second aperture or the third hole and the third aperture about the support arm. Because of the arrangement of the sheets relative to one another, their individual arrangement of holes or apertures, and the location of their connection or pivot point, the sheets hang in a different position on the support arm higher or lower with every adjustment. With reference to FIGS. 4A–4C, this is seen as the attenuator or blocker 20 hanging in various operational positions in a vehicle whereby height H3>height H4>height H5. Of course, as different vehicles utilize the attenuator or blocker, the various heights may be similar or different from that shown.

Figure 5:
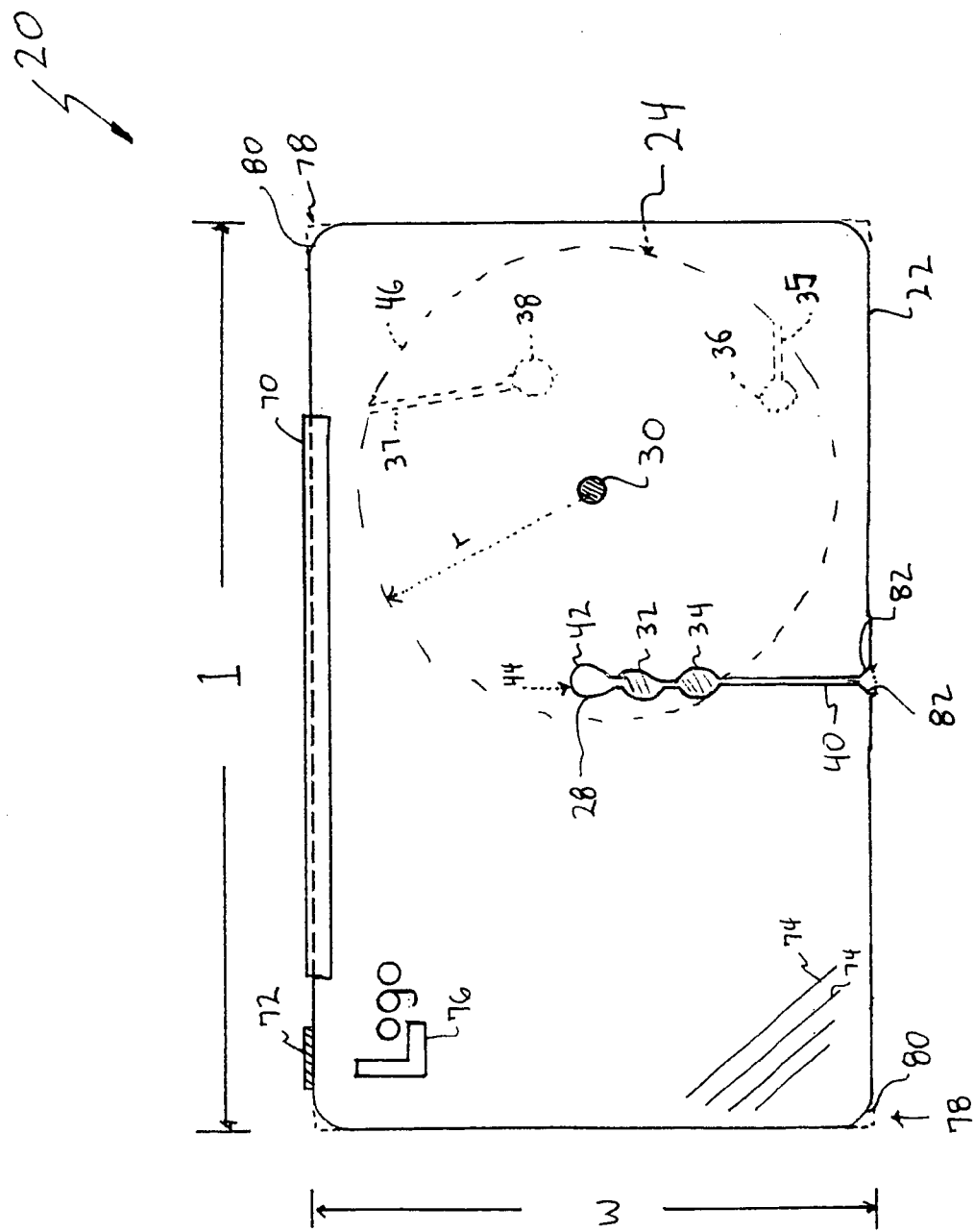
FIG. 5 is a diagrammatic view in accordance with the present invention of a more detailed light attenuator or blocker having adjustment features.
Figure 6:
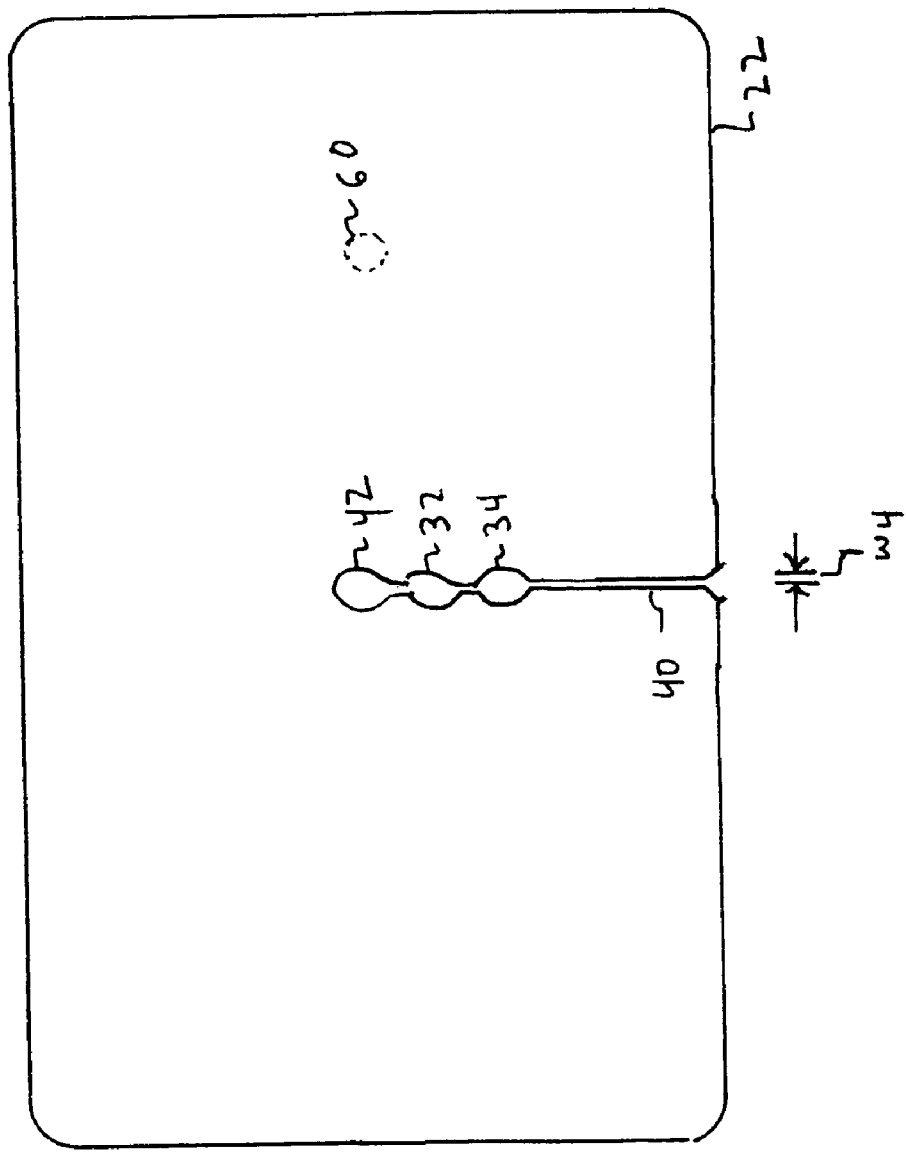
FIG. 6 is a diagrammatic view in accordance with the present invention of a first sheet of the light attenuator or blocker having adjustment features.
Figure 7:
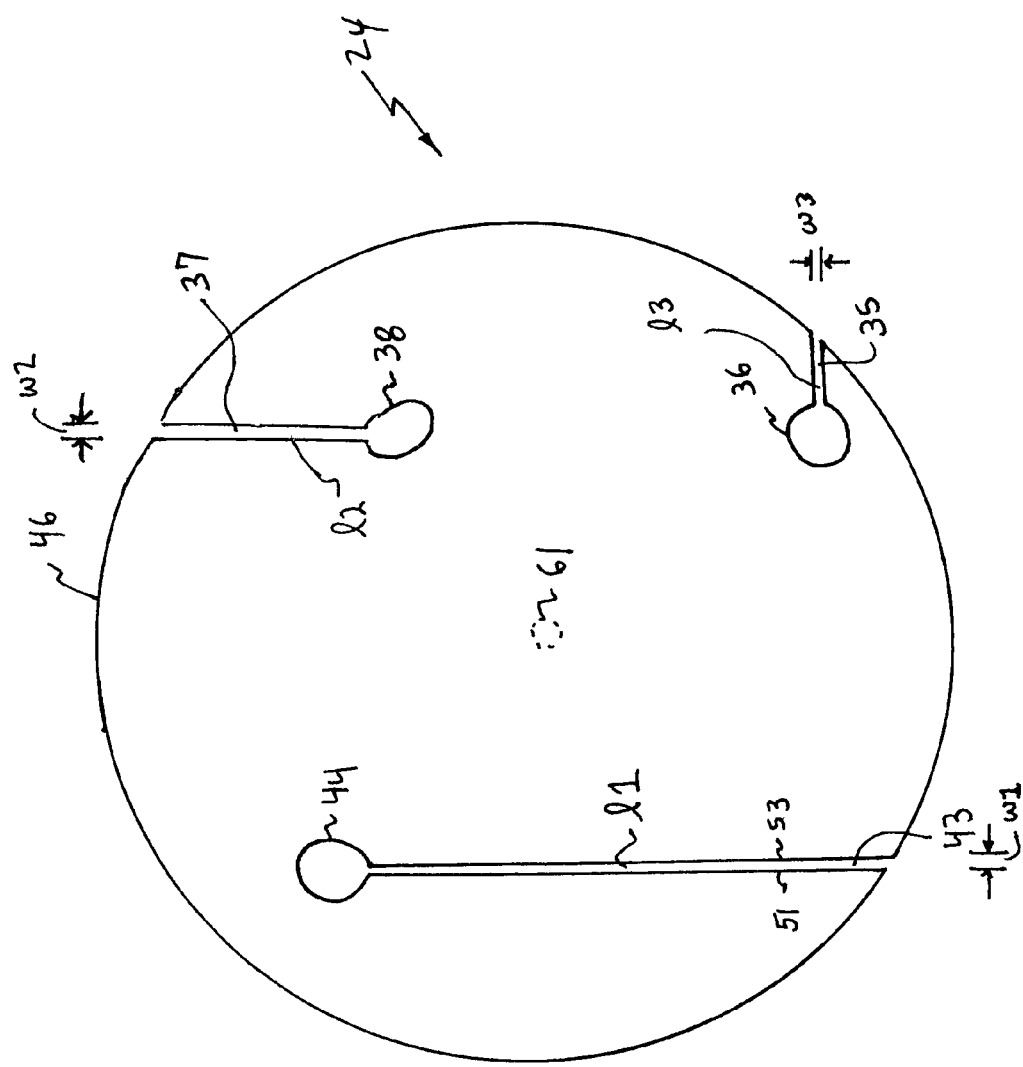
FIG. 7 is a diagrammatic view in accordance with the present invention of a second sheet of the light attenuator or blocker having adjustment features.

With reference to FIGS. 5, 6 and 7, a more detailed attenuator or blocker 20 is given. In this regard, the attenuator or blocker weighs a few ounces to a few pounds. Its first sheet 22 comprises a generally rectangular shape having dimensions of about 9 inches (w) by about 13 inches (1). The second sheet 24 comprises a generally circular shape and has a radius r of about 7 to about 8 inches. In thickness, the first and second sheets are about 0.0025 inches thick as labeled t1, t2 in FIG. 3. Of course, other sizes are contemplated as are other shapes of the sheets. A dominant factor for determining the actual size relates to the amount of light desired to be attenuated or blocked in a given vehicle and the space constraints, e.g., FIG. 2, between the visors 12, 14, the rear view mirror 27, the support arm 25 and the dashboard 21. Slope, S, of the windshield in FIG. 3 relative to the support arm, and the relative positioning of the attenuator or blocker 20 between the windshield 16 and the mirror 27, are other factors that should be considered in setting a design point.

Regardless, the composition of the sheets is such that light is attenuated or blocked. In this regard, a plastic sheet is preferred having a homogeneous tinting made of any color and any lightness or darkness. Preferred embodiments contemplate dark shades of all colors to comfort the vision of drivers. Ultraviolet blocking is also possible. Alternatively, the sheets may be opaque or have varying degrees of translucence. They may also comprise metal, wood or other materials. In still other embodiments, the sheets may be arranged to add, subtract or shift colors upon the light impacting one or both of the sheets. Still other designs contemplate sheets lacking continuity such that perforations or other holes are found therein.

At about a midpoint along the length of the first sheet is a slot 40. It extends vertically to about the halfway position of the sheet in the width dimension. At a terminal end of the slot, and along portions of its length, are one or more holes 42, 32, and 34 cut through a thickness of the sheet. Similarly, the second sheet 24 includes a plurality of apertures 36, 38 and 44. Extending from a periphery 46 to each of the apertures is an attendant cut 35, 37, and 43, respectively. In this manner, upon rotation of the two sheets about the pivot point 30, a hole of the first sheet aligns and registers with an aperture of the second sheet and together (e.g., element 28) they accommodate the support arm of the rear view mirror in a vehicle and light is attenuated or blocked in the vicinity of the mirror. As shown in FIG. 5, the hole 42 of the first sheet 22 is registered and aligned with the aperture 44 of the second sheet. In other embodiments, however, it is expected to register and align holes 32 and 34 with apertures 38 and 36, respectively, to create various height operational positions as seen in FIGS. 4A–4C, for example. Because of the functionality of having various lengths 11, 12, and 13 of cuts in the second sheet leading to their respective apertures, it is only possible that one hole of the first sheet will align properly with one other aperture of the second sheet. In this manner, the various operational heights H3, H4 and H5 (FIGS. 4A–4C) are readily guaranteed. Of course, there is no requirement that the invention only have a one-to-one hole-to-aperture correspondence. Advantage, of course, can be gained in other scenarios readily contemplated by skilled artisans. Also, as each hole and aperture of the sheets are manipulated to align and register, simultaneously so to is the cut of the attendant aperture manipulated to align and register with the slot of the first sheet. As shown in FIG. 5, the cut 43 (FIG. 7) in the second sheet 24 attendant with the aperture 44 registers and aligns with the slot 40 in the first sheet. In this manner, the support arm of the rear view mirror can be fitted through or past both the slot and the cut and seated in the combined hole and aperture arrangement 28. Further, but not required, by sizing and shaping the holes and apertures to generally conform to one another and to an outer surface 41 (FIG. 3) of the support arm, snugness of the attenuator or blocker 20 on the support arm is achieved. In turn, this helps prevent unseating or inadvertent repositioning of the attenuator or blocker as the vehicle encounters rough, rugged or potholed driving terrain. Naturally, either the first sheet or second sheet can be arranged closer or farther from the windshield, depending on user preference.

To form the holes, apertures, slot and cuts, it is expected that shears, snips, scissors, saw blades, lasers or other cutter will slice the sheets in the appropriate pattern. The slot and cuts may also be relatively channeled. That is, a width w1, w2, w3 or w4 may develop between opposing flaps 51, 53 (FIG. 7, for example) such that they do not touch one another. In the alternative, the opposing flaps may, indeed, touch one another when in an undisturbed or resting position because of cutting or slitting operations that remove very little material from the sheets. Still other embodiments contemplate stamping operation with well known techniques from the tool and die industry, for example.

The pivot point 30 is formed by mating openings 60, 61 of the first and second sheets together and inserting an axle of sorts (not shown). Other embodiments include, but are not limited to, riveting, screwing, nut/bolting, buttoning, or like operations for the two sheets. It is preferred, however, but not required, that the two sheets remain free to spin or circulate about the pivot point without undue interference from the other sheet or the pivot point itself.

In various optional embodiments, it is contemplated that one or both of the first and second sheets will include a handle 70 of sorts to make carrying convenient. As shown, a relatively thick plastic binder adheres or mechanically connects along a lengthwise edge of the first sheet 22 to provide users with a convenient point to grasp the attenuator or blocker 20. In other embodiments, openings (not shown) may be provided to accommodate a user's hand or fingers. Positive handle structures, such as the binder, however, contribute to attenuating or blocking light whereas negative handle structures, such as openings (not shown), allow light to pass.

Appreciating the first sheet connects to the second sheet at the pivot point of the attenuator or blocker 20 substantially off center, the weight of the second sheet tends to create a moment arm during use when the attenuator or blocker is hung from the support arm of the mirror. To balance or offset this, a counterweight 72 is provided on the first sheet. Its weight and arrangement are selected according to the amount of pivot induced in the attenuator or blocker 20 by the second sheet and skilled artisans are readily familiar with this calculation.

For optical or other effect, one or more refraction lines 74 can be embossed, scored or otherwise formed in one or more of the front or back surfaces of either the first or second sheets. Texturing of the surfaces, or not, is also contemplated.

For reasons of marketing, showing personality or other, a logo 76 may be adhered, embossed, scored or otherwise formed in one or more surfaces of the sheets of the attenuator or blocker 20. Appreciating the surfaces will often be in the direct line of light, it may be desirable to use various optical effects to highlight features of the Logo.

At the corners 78 of the first sheet of the attenuator or blocker 20, chamfer cuts 80 or other rounding surfaces may be found to prevent sharp obstacles from being present in the design. Chamfer cuts 82 or other rounding surfaces may be also found in the slot of the first sheet or the one or more cuts of the second sheet. Again, this prevents sharp obstacles from being present.

Figure 8:
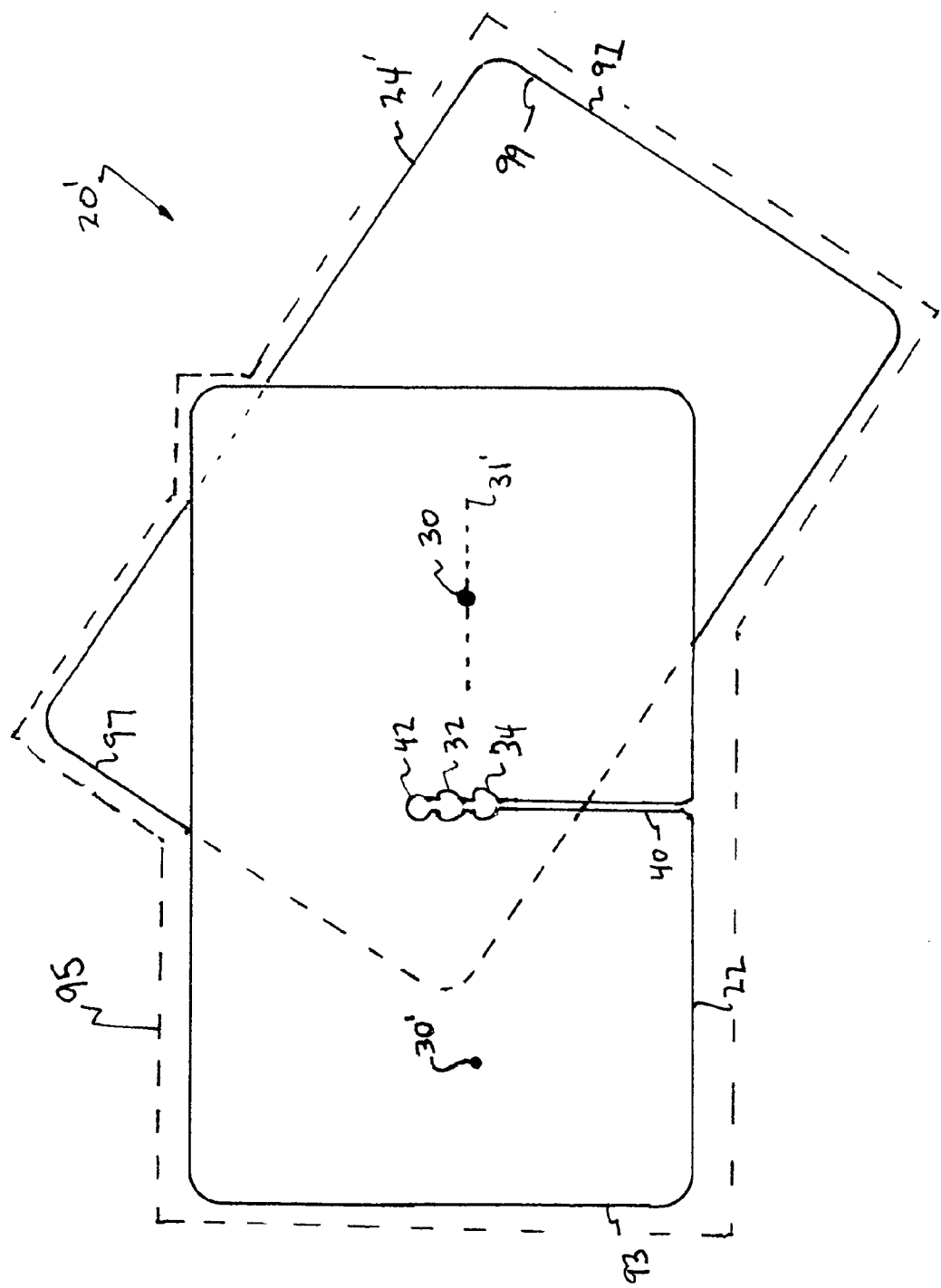
FIG. 8 is a diagrammatic view in accordance with the present invention of an alternate embodiment of the light attenuator or blocker having adjustment features.

With reference to FIG. 8, skilled artisans will appreciate advantage of the invention can be garnered with an attenuator or blocker 20' having variously sized and shaped first and second sheets 22, 24'. In this regard, the first sheet 22 is as previously described and the second sheet includes apertures and cuts (not shown) for aligning and registering with the holes 32, 34, 42 and slot 40 of the first sheet. In a departure from the previous design, however, the second sheet 24' has a periphery 91 that exceeds the periphery 93 of the first sheet. Upon rotating connection of the two sheets, and hanging same from a support arm of a rear view mirror in a vehicle, it is to be appreciated that light is attenuated or blocked in a boundary 95 larger than the periphery of the first or second sheet alone. Of course, the shape of the second sheet 24' is given as generally rectangular, but there is no reason why it cannot include a circular shape, as previously described, or an oval, triangular, trapezoidal, square, irregular or other shape. The same is also true of the shape of the first sheet.

In other differences from the previous design, the pivot point 30 is still substantially offset from a center of the first sheet 22, but it is also offset from a center of the second sheet 24'. In this manner, various boundaries for attenuating or blocking light are contemplated. For instance, by setting the pivot point 30 closer to end 97, vice 99, of the second sheet, the second sheet hangs relatively closer to the dashboard than if the pivot point were centrally disposed. In turn, more light attenuating or blocking boundary is achieved. A slit 31' in the second sheet may also be added to allow pulling or pushing of the second sheet to accommodate the support arm. In addition to or in lieu of the second sheet 24' shown, an alternate pivot point 30' and attendant sheet (not shown) may be found on an opposite side of the slot 40 of the first sheet. Other designs, of course, are within the skill set of an ordinary artisan.

Figure 9:
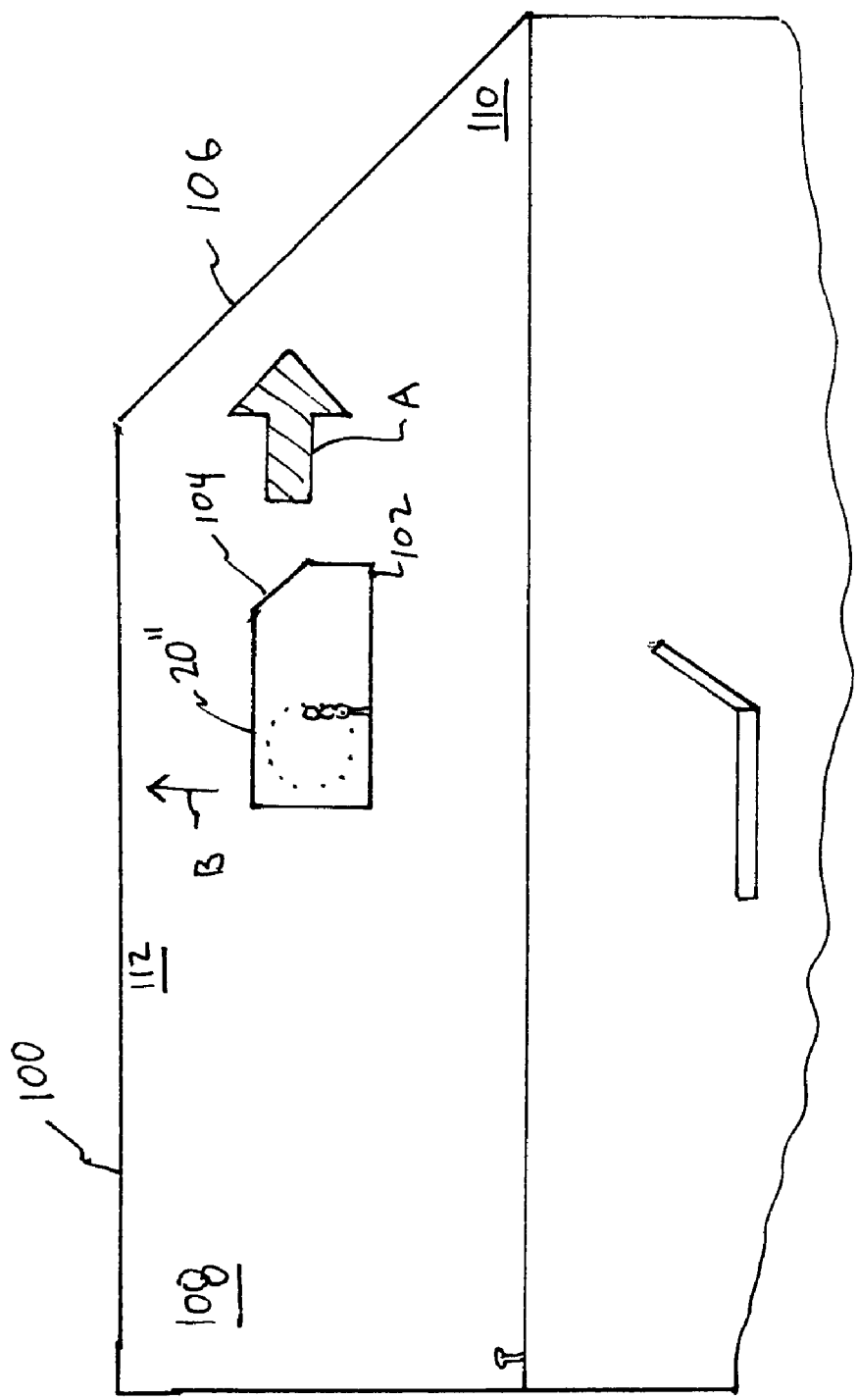
FIG. 9 is a diagrammatic view in accordance with the present invention of the light attenuator or blocker having adjustment features in an alternate operational position.

Appreciating the attenuator or blocker of the invention is lightweight, and thus relatively mobile, it can dually function to block or attenuate light in windows of a vehicle other than the windshield. With reference to FIG. 9, a door 100 of a vehicle includes a window 108 in which users sometimes desire to attenuate or block light. By shaping the periphery 102 of the attenuator or blocker 20" with a cut or shape 104 to mimic the shape 106 of the door window, the attenuator or blocker can be slid or positioned in the direction of the arrow A and frictionally fit between a rubber gasket of the door frame (not shown) and the glass of the window to attenuate or block light near a front portion 110 of the door window. Alternatively, by sliding or positioning the attenuator or blocker 20" in the direction of arrow B, light is attenuated or blocked near an upper portion 112 of the door window. Naturally, skilled artisans can contemplate similar and other uses.

In any embodiment, certain advantages of the invention over the prior art are readily apparent. For example, the selection of lightweight and simple materials tends to lower manufacturing costs. More intuitively, simple patterns and geometric shapes provide easy user operation. Also, because the registering of holes with apertures, and accommodating a rear view mirror support arm with same, provides a relatively secure fit in the vehicle, a light attenuation or blocking apparatus is achieved that generally thwarts inadvertent misalignment or unseating of the apparatus during jostled use.

Finally, one of ordinary skill in the art will recognize that additional embodiments are also possible without departing from the teachings of the present invention. This detailed description, and particularly the specific details of the exemplary embodiments disclosed herein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. An adjustable light attenuator or blocker for a vehicle having a support arm for a rear view mirror, comprising:
   a first sheet having a plurality of holes; and
   a second sheet rotatingly connected to the first sheet and having a plurality of apertures, wherein one of the apertures of the second sheet rotates and substantially aligns and registers with one of the holes of the first sheet to accommodate said support arm during use.

2. The light attenuator or blocker of claim 1, wherein the first and second sheets are translucent or opaque.

3. The light attenuator or blocker of claim 1, wherein the first and second sheets combine to add or subtract colors.

4. The light attenuator or blocker of claim 1, wherein the first and second sheets are plastic.

5. The light attenuator or blocker of claim 1, wherein the first and second sheets are tinted.

6. The light attenuator or blocker of claim 1, wherein a periphery of the first or second sheet exceeds a periphery of the other of the first or second sheet during use to attenuate or block light in a boundary larger than either the periphery of the first or second sheet.

7. The light attenuator or blocker of claim 1, wherein the plurality of holes of the first sheet substantially align along a length of a slot through which the support arm is fitted during use.

8. The light attenuator or blocker of claim 1, wherein each said aperture of the second sheet includes a cut through which the support arm is fitted during use.

9. The light attenuator or blocker of claim 1, further including a handle for one or both the first and second sheets.

10. The light attenuator or blocker of claim 1, further including a counterweight for one of the first and second sheets.

11. The light attenuator or blocker of claim 1, wherein the first sheet and second sheet freely circulate about a pivot point when not engaged with the support arm during use.

12. The light attenuator or blocker of claim 11, wherein the pivot point resides substantially centrally on the second sheet and substantially off center on the first sheet.

13. An adjustable light attenuator for a vehicle having a support arm for a rear view mirror, comprising:
   a first tinted sheet having a plurality of holes and a slot; and
   a second tinted sheet rotatingly connected to the first sheet and having a plurality of apertures and a cut associated with each said aperture, wherein one of the apertures of the second sheet and the cut associated therewith substantially aligns and registers by rotating with one of the holes and the slot of the first sheet to accommodate said support arm during use, the support arm for fitting through both the slot and the cut associated with the one of the apertures, wherein the cuts and the slot have opposing flaps generally touching one another in an undisturbed position so that when the one of the holes and the one of the apertures accommodate said support arm during use, the other of the holes and apertures are unable to pass unattenuated light because of either a presence of the second or first tinted sheet, respectively.

14. The light attenuator of claim 13, further including a handle for the first sheet.

15. The light attenuator of claim 13, further including a counterweight for the first sheet to balance the second sheet.

16. The light attenuator of claim 13, wherein the first sheet and second sheet freely circulate about a pivot point when not engaged with the support arm during use.

17. The light attenuator of claim 16, wherein the pivot point resides substantially centrally on the second sheet and substantially off center on the first sheet.

18. A method of attenuating or blocking light in a vehicle, comprising:
   registering a hole of a first sheet with an aperture of a second sheet connected to the first sheet by rotating the first or second sheet relative to the other so that the hole and the aperture align and register with one another and form an opening suitable for snugly accommodating a support arm of a rear view mirror in the vehicle; and
   fitting both the hole of the first sheet and the aperture of the second sheet about the support arm of the rear view mirror in the vehicle.

19. The method of claim 18, further including fitting the support arm through a slot associated with the hole of the first sheet and a cut associated with the aperture of the second sheet, wherein the cut and the slot each have opposing flaps generally touching one another in an undisturbed position so that the fitting the support arm through the cut and slot further includes manually separating the opposing flaps and inserting the support arm in between.

20. The method of claim 18, further including adjusting the first and second sheets relative to the support arm by registering a second hole of the first sheet with a second aperture of the second sheet and fitting both the second hole and the second aperture about the support arm thereby lowering or raising the first and second sheets relative to the support arm.

* * * * *